United States Patent
Goswami et al.

(10) Patent No.: US 9,879,166 B1
(45) Date of Patent: Jan. 30, 2018

(54) ENCAPSULATION OF THERMAL ENERGY STORAGE MEDIA

(71) Applicants: Dharendra Yogi Goswami, Tampa, FL (US); Elias K. Stefanakos, Tampa, FL (US); Chand K. Jotshi, Gainesville, FL (US); Jaspreet Dhau, Tampa, FL (US)

(72) Inventors: Dharendra Yogi Goswami, Tampa, FL (US); Elias K. Stefanakos, Tampa, FL (US); Chand K. Jotshi, Gainesville, FL (US); Jaspreet Dhau, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 14/741,427

(22) Filed: Jun. 16, 2015

Related U.S. Application Data

(60) Provisional application No. 62/012,633, filed on Jun. 16, 2014.

(51) Int. Cl.
| | |
|---|---|
| *C09K 5/00* | (2006.01) |
| *C09K 5/06* | (2006.01) |
| *C09K 5/04* | (2006.01) |
| *F28D 20/00* | (2006.01) |

(52) U.S. Cl.
CPC ............. *C09K 5/063* (2013.01); *C09K 5/04* (2013.01); *C09K 5/06* (2013.01); *F28D 20/00* (2013.01)

(58) Field of Classification Search
CPC ............. F28D 20/00; F28D 2020/0017; F28D 2020/026; F28D 2020/0047; F28D 20/0056; C09K 5/04; C09K 5/06
USPC .......................................................... 252/71
See application file for complete search history.

(56) References Cited

U.S. PATENT DOCUMENTS

| | | | |
|---|---|---|---|
| 3,930,876 A * | 1/1976 | Nakajima | C09D 1/02 106/287.11 |
| 4,513,053 A | 4/1985 | Chen et al. | |
| 4,657,067 A | 4/1987 | Rapp et al. | |
| 4,809,771 A * | 3/1989 | Kennel | C09K 5/06 126/400 |
| 4,993,481 A * | 2/1991 | Kamimoto | C04B 38/0006 126/643 |
| 5,500,223 A | 3/1996 | Behan et al. | |
| 5,963,132 A | 10/1999 | Yoakum | |
| 8,221,910 B2 | 7/2012 | Hartmann et al. | |
| 2010/0087115 A1 | 4/2010 | Davis et al. | |
| 2011/0077176 A1 | 3/2011 | Smith et al. | |

(Continued)

FOREIGN PATENT DOCUMENTS

| | | | | |
|---|---|---|---|---|
| CN | 101788239 A * | 7/2010 | ............. | F28D 20/00 |
| WO | WO 01/06195 A1 * | 1/2001 | ............. | F28D 20/02 |

(Continued)

OTHER PUBLICATIONS

Machine translation of CN 101788239 A, published Jul. 28, 2010.*

(Continued)

*Primary Examiner* — Jane L Stanley
(74) *Attorney, Agent, or Firm* — Thomas | Horstemeyer, LLP

(57) ABSTRACT

In one embodiment, a method for fabricating a ceramic phase change material capsule includes forming a hollow ceramic capsule body having a filling hole, filling the ceramic capsule body with one or more phase change materials via the filling hole, and closing and sealing the filling hole.

15 Claims, 5 Drawing Sheets

(56) References Cited

U.S. PATENT DOCUMENTS

| | | |
|---|---|---|
| 2011/0108241 A1 | 5/2011 | Driscoll et al. |
| 2011/0259544 A1 | 10/2011 | Neti et al. |
| 2012/0018116 A1 | 1/2012 | Mathur et al. |
| 2013/0077731 A1* | 3/2013 | Sherwood ................ G21C 3/07 376/417 |
| 2013/0105106 A1* | 5/2013 | Goswami ............. F28D 20/026 165/10 |
| 2013/0298991 A1 | 11/2013 | Parker et al. |

FOREIGN PATENT DOCUMENTS

| | | |
|---|---|---|
| WO | WO0196061 A1 | 12/2001 |
| WO | WO2009112360 A1 | 9/2009 |

OTHER PUBLICATIONS

Goswami et al., "Low Cost Encapsulated Phase Change Materials for Utility Scale Thermal Energy Storage", SunShot Concentrating Solar Power Program Review, Apr. 23-25, 2013, p. 69-70.*
Foreign search report dated Nov. 3, 2015 for PCT/US 15/36105.

* cited by examiner

ENCAPSULATION OF THERMAL ENERGY STORAGE MEDIA

CROSS-REFERENCE TO RELATED APPLICATION

This application claims priority to U.S. Provisional Application Ser. No. 62/012,633, filed Jun. 16, 2014, which is hereby incorporated by reference herein in its entirety.

NOTICE OF GOVERNMENT-SPONSORED RESEARCH

This invention was made with Government support under grant/contract number DE-AR0000179 awarded by the U.S. Department of Energy (DOE). The Government has certain rights in the invention.

BACKGROUND

Thermal energy storage is critical to the future of solar thermal power. Such storage reduces the cost of the energy and enables the energy to be available both during and after daylight hours. The selection of appropriate thermal energy storage media is important to developing an effective thermal energy storage scheme. Phase change materials (PCMs) are particularly attractive for such applications because they can store much more heat than sensible heat storage materials.

It would be desirable to use PCMs both in future installations as well as existing installations that are not specifically configured for use of such materials. In view of this, it would further be desirable to develop a way to encapsulate PCMs so that they can be used in both future and existing installations.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Figure 1:
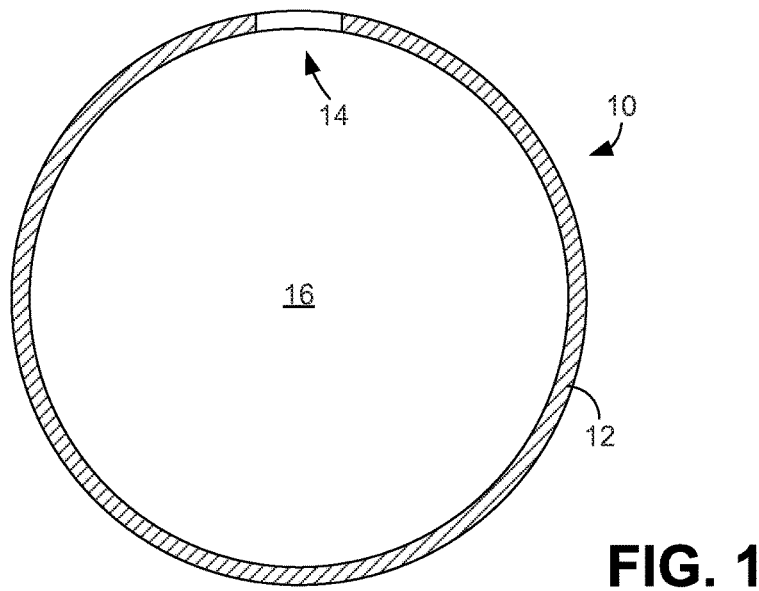
FIG. 1 is a cross-sectional view of an embodiment of a ceramic capsule body.

As described above, it would be desirable to have a way to encapsulate thermal energy storage media, such as phase change materials (PCMs). Disclosed herein are encapsulation methods and capsules that are appropriate for this purpose. In the disclosed methods, one or more PCMs are contained within a ceramic capsule. In some embodiments, a hollow ceramic capsule body is initially fabricated, the capsule body is filled with one or more PCMs via a filling hole within the body, and the hole is then closed and sealed. A sealing material can be applied to or integrated into the ceramic material of the capsule body to render it non-porous. In alternative embodiments, a ceramic PCM capsule is created by initially forming a solid PCM pellet and then applying a ceramic material to the pellet.

In cases in which the ceramic capsule body includes a filing hole that must be closed and sealed, the capsule body can be filled with two or more PCMs that, when mixed, form a eutectic PCM having a melting point that is lower than the melting points of the individual PCMs. If the PCMs are added to the capsule separately so they do not mix, a sealing material can be selected to close the hole of the capsule body that will melt at a temperature that is lower than the melting points of the separate PCMs but higher than the melting point of the eutectic PCM. Therefore, the capsule can be sealed by heating the capsule to a temperature at which the sealing material melts but the individual PCMs do not, and the capsule can then be shaken to mix the PCMs to form the eutectic PCM.

In the following disclosure, various specific embodiments are described. It is to be understood that those embodiments are example implementations of the disclosed inventions and that alternative embodiments are possible. All such embodiments are intended to fall within the scope of this disclosure.

Introduction

PCM capsules were previously developed by the inventors that comprised a PCM core surrounded by a metal shell. A layer of polymer material was provided between the PCM and the shell to prevent molten PCM from contacting the metal and corroding it. While such capsules are effective for low-temperature applications, they may be less effective for high-temperature applications (e.g., above 400° C.) because such high temperatures degrade most polymeric materials.

In view of the potential limitations of the previous PCM capsule design, it has been determined to encapsulate relatively high-temperature PCM in ceramic materials that can withstand higher temperatures than polymer materials and that are less reactive with molten PCM than metal. As will be apparent from the discussion that follows, the advantages of ceramic capsules include: (1) the compatibility of the encapsulating material with the molten PCMs, (2) the capsules being non-porous to the molten PCMs, (3) the accommodation of the expansion of the PCM at elevated temperatures both in the solid and in the liquid states, and (4) the accommodation of the expansion of air upon heating of the capsules.

Capsule Body Fabrication

As noted above, capsules can be used to contain one or more PCMs. Although metal could be used to form the capsules, metals corrode in the presence of molten PCMs, such as molten alkali metal chlorides, at high temperatures. Ceramic materials are less susceptible to corrosion in the presence of molten PCMs at high temperatures and are therefore better candidates for forming a PCM capsule. However, ceramic materials can be inherently porous to many PCMs when sintered at relatively low temperatures (e.g., 850 to 1100° C.) for a short duration of time (e.g., 4 to 5 hours). Although ceramic materials can be made non-porous to substantially all PCMs by sintering at higher temperatures (e.g., 1200 to 1600° C.) for long periods of time (e.g., 24 to 30 hours), this renders the manufacturing process undesirably expensive.

An alternative way in which a ceramic material can be made non-porous to molten PCM is to coat the ceramic material with a glazing material. Unfortunately, glazing materials can react with the molten PCM as they often contain transition and non-transition metal oxides that react with the molten alkali metal chlorides and silicates. The porous ceramic material can also react with the molten alkali metal chlorides, leading to critical structural changes at the grain boundary of the sintered ceramic that can result in the development of micro-cracks that subsequently grow in size during thermal cycling and lead to leakage of the molten salts. However, other materials, such as alkali metal silicates like sodium silicate and lithium metasilicate and borates like sodium metaborate tetrahydrate and sodium tetraborate, do not react with molten PCM. Such materials can therefore be used as sealing materials that coat the ceramic material of the capsule body and fill its pores to prevent direct contact of the molten PCM with the ceramic material and passage of the PCM through the ceramic material. Several approaches in which a ceramic capsule body can be fabricated and its material sealed with such a sealing material are described below.

In a first approach, a capsule body is first formed and a sealing material is later applied to the capsule body to coat it and fill its pores. The capsule body can be made of a ceramic material that comprises a mixture of one or more of feldspar, kaoline, ball clay, bentonite, alumina, silica, and an organic polymer. FIG. 1 illustrates an example of such a capsule body 10. As shown in this figure, the body 10 includes a spherical outer shell 12, which is made of ceramic material. Although the shell 12 depicted and described as being spherical, it is noted that other shapes are possible. The shell 12 can be molded or cast so as to comprise a filling hole 14 at its top that enables the interior space 16 of the body 10 to be filled with one or more PCMs (in powder or molten form).

The ceramic capsule body can be partially sintered and immersed in a solution of sealing material and water. In some embodiments, the solution can have an approximately 15% to 25% concentration of sodium silicate. The immersed capsule body can be placed in a vacuum chamber and a vacuum can be applied to remove air from the pores of the ceramic material and enable the sealing material to fill them. The coated capsule body can then be cured, for example at a temperature of approximately 1040° C. During this curing, a uniform layer of sealing material forms over the entire surface of the ceramic capsule body and fills the pores of the ceramic material. The result is a non-porous ceramic capsule body that can be filled with PCM. After such filling, the hole in the capsule body can be closed and sealed with a suitable material. Examples of this closing and sealing are described below. Regardless of the manner in which the ceramic capsule body is closed and sealed, it will not react with the molten PCM and can undergo repeated thermal cycling.

Figure 2:
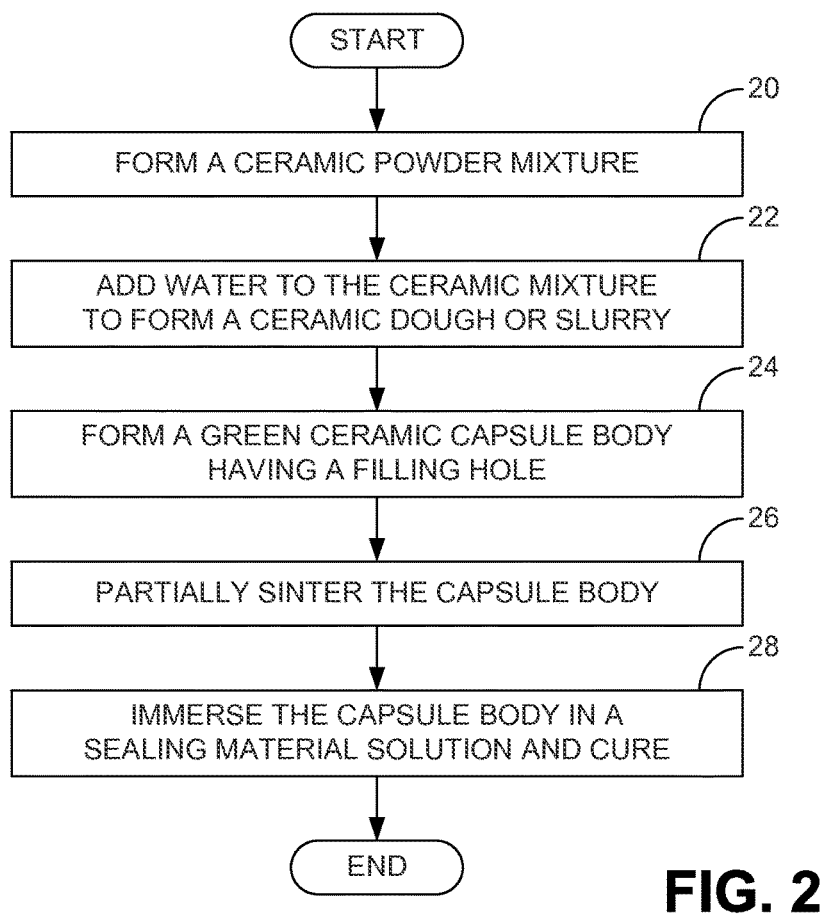
FIG. 2 is a flow diagram of a first embodiment of a method for forming a non-porous body for a ceramic phase change material (PCM) capsule.

The flow diagram of FIG. 2 illustrates an example method for forming a PCM capsule body consistent with the above-described approach. Beginning with block 20 of FIG. 2, a ceramic powder mixture is formed. As noted above, the mixture can comprise one or more of feldspar, kaoline, ball clay, bentonite, alumina, silica, and an organic polymer. Next, water can be added to the ceramic mixture and mixed therewith to form a ceramic dough or slurry, as indicated in block 22.

Once the dough or slurry has been formed, it can be used to form a green (unsintered) ceramic capsule body having a filling hole, as indicated in block 24. In some embodiments, the body can be formed using die or slip casting. Next, the ceramic capsule body can be partially sintered, as indicated in block 26. By way of example, the capsule body can be partially sintered at a temperature of approximately 1040° C.

At this point, the capsule body can be immersed in a sealing material solution and then cured to form a non-porous sintered ceramic capsule body, as indicated in block 28. By way of example, the capsule body can be dipped in a sodium silicate solution and cured at a temperature of approximately 1040° C.

In a second approach, the sealing material and the ceramic material are mixed together before the capsule body is formed. For example, a dry mixture of unsintered ceramic powder and sodium silicate powder can be prepared with the sodium silicate powder being present in the mixture in a concentration of approximately 5 to 40%. A slurry can then be formed by adding water to the mixture so that a green ceramic capsule body results. The green ceramic capsule body can then be sintered in a controlled temperature environment up to approximately 1040° C. for approximately 1 to 2 hours to produce a non-porous ceramic capsule body that can be filled with PCM.

Figure 3:
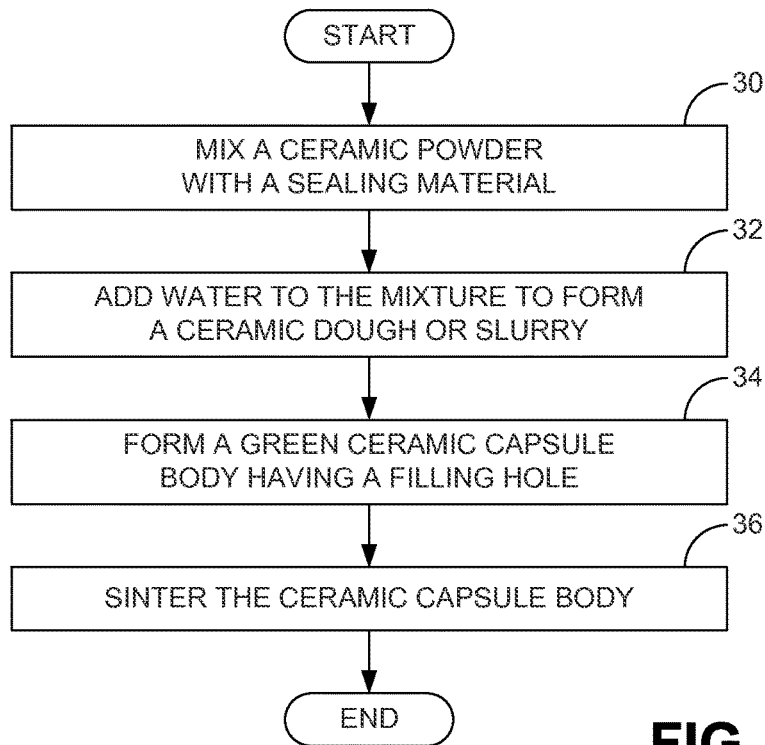
FIG. 3 is a flow diagram of a second embodiment of a method for forming a non-porous body for a ceramic PCM capsule.

The flow diagram of FIG. 3 illustrates an example method for forming a PCM capsule body consistent with the above-described approach. Beginning with block 30 of FIG. 3, a ceramic powder is mixed with a sealing material, which can also be in powder form. In some embodiments, the sealing material comprises sodium silicate. Next, water can be added to the mixture and mixed therewith to form a ceramic dough or slurry, as indicated in block 32.

Once the dough or slurry has been formed, it can be used to form a green ceramic capsule body having a filling hole, as indicated in block 34. As before, the body can be formed using die or slip casting. Next, the ceramic capsule body can be sintered, as indicated in block 36, to form a non-porous sintered ceramic capsule body. By way of example, sintering can be performed at approximately 1040° C.

Although sodium silicate was described as a sealing material in the two approaches described above, it is noted that other sealing materials can be used. For example, sodium metaborate tetrahydrate is another material that can serve the same function as sodium silicate but at much lower temperatures, e.g., approximately 900 to 1000° C. When sodium metaborate tetrahydrate is used in the second approach, the sintering temperature and duration can be reduced.

In third approach, a thin glassy layer of sealing material can be formed on the inside of a sintered ceramic capsule body. The sealing material, such as sodium metaborate tetrahydrate, can be poured into the capsule body and the capsule can be heated to approximately 920 to 960° C. The resulting layer is non-porous and non-reactive to molten alkali metal chlorides.

Figure 4:
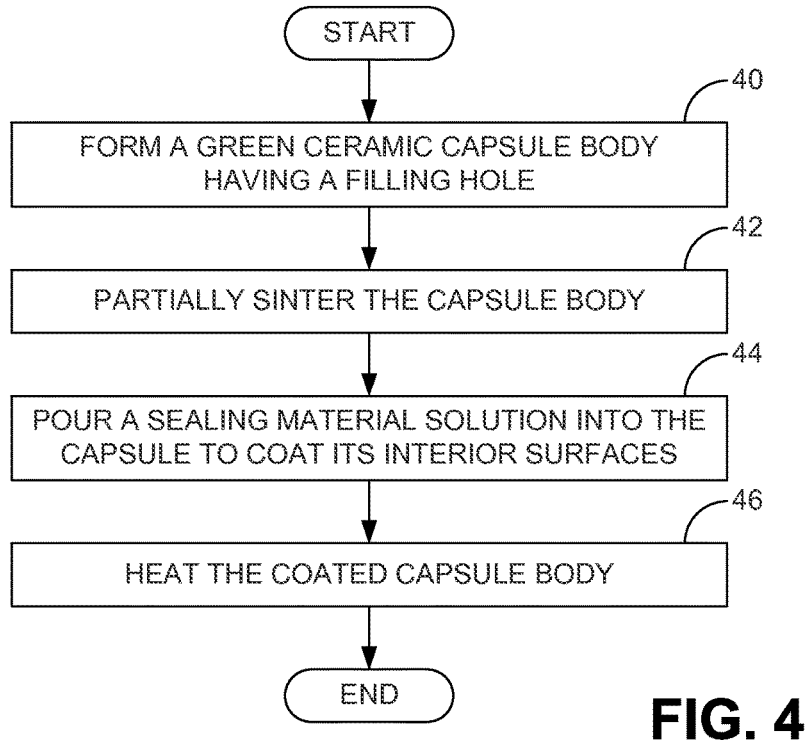
FIG. 4 is a flow diagram of a third embodiment of a method for forming a non-porous body for a ceramic PCM capsule.

The flow diagram of FIG. 4 illustrates an example method for forming a PCM capsule body consistent with the above-described approach. Beginning with block 40 of FIG. 4, a green ceramic capsule body having a filling hole is formed in the same manner as described above in relation to FIG. 2.

Next, the green ceramic capsule body can be partially sintered, as indicated in block 42. By way of example, the capsule body can be partially sintered at a temperature of approximately 1040° C. Once partial sintering has been performed, a sealing material solution can be poured into the capsule body to coat its interior surfaces, as indicated in block 44. By way of example, the sealing material can be sodium metaborate tetrahydrate. At this point, the coated capsule body can be heated, as indicated in block 46. As noted above, this heating can be performed at approximately 920 to 960° C.

Capsule Body Closing/Sealing

Once the capsule body has been fabricated, PCM can be poured into the capsule body through its filling hole. This hole must be closed and sealed before the capsule can be used. While a ceramic cap could be provided over the hole while both the cap and the capsule body are in the green state and the closed capsule could then be sintered to seal it and render it non-porous, the required sintering temperature is typically higher than the melting temperature of the PCM. If the capsule were filled with PCM and then sintered, the PCM would melt and may leak out from the capsule before the sealing process is completed. Therefore, a closure material other than an unsintered ceramic material may be needed to close and seal the capsule. The selected material must not react with the molten PCM and must have a melting point that is greater than the PCM. In addition, the hole must be closed at an elevated temperature to enable air to escape the capsule that could otherwise expand during use and could cause the capsule to rupture. Furthermore, alkali metal chlorides should be avoided because they tend to creep in the molten state and thus prevent proper closure of the hole. Moreover, the closure material must be able to survive thermal cycling.

Capsule closure and sealing approaches have been developed that satisfy the above-described requirements. In these approaches, an empty sintered ceramic capsule body is filled with two or more PCMs in a powder form that, when mixed, form a eutectic PCM (e.g., eutectic salt). Eutectic materials are mixtures of components (chemical compounds or elements) that melt at temperatures lower than the melting points (MPs) of the individual components alone. The capsule body can be filled with the PCMs in a manner in which they do not mix to a significant degree. In a first approach, a sealing material, such as one of the sealing materials described above, can be used to form a cap that closes the hole and the filled capsule can then be heated to a temperature at which the sealing material melts and seals the hole.

If the PCMs and sealing materials are selected correctly, sealing of the capsule can be achieved at a temperature below the MPs of the unmixed PCMs. Once sealing has been completed, however, the PCMs can be mixed in-situ to form a eutectic PCM within the capsule that will melt at temperature below the melting point of the sealing material. For instance, if the PCMs are sodium chloride (MP=801° C.) and potassium chloride (MP=770° C.) and the sealing material is sodium tetraborate (MP=740° C.), the PCM-filled capsule can be sealed at a temperature of 760° C., which is below the MPs of both PCMs but above the MP of the sealing material. Once the PCMs are mixed, however, the resulting eutectic PCM will melt at a temperature of approximately 657° C., which is well below the MP of the sodium tetraborate sealing material.

Figure 5:
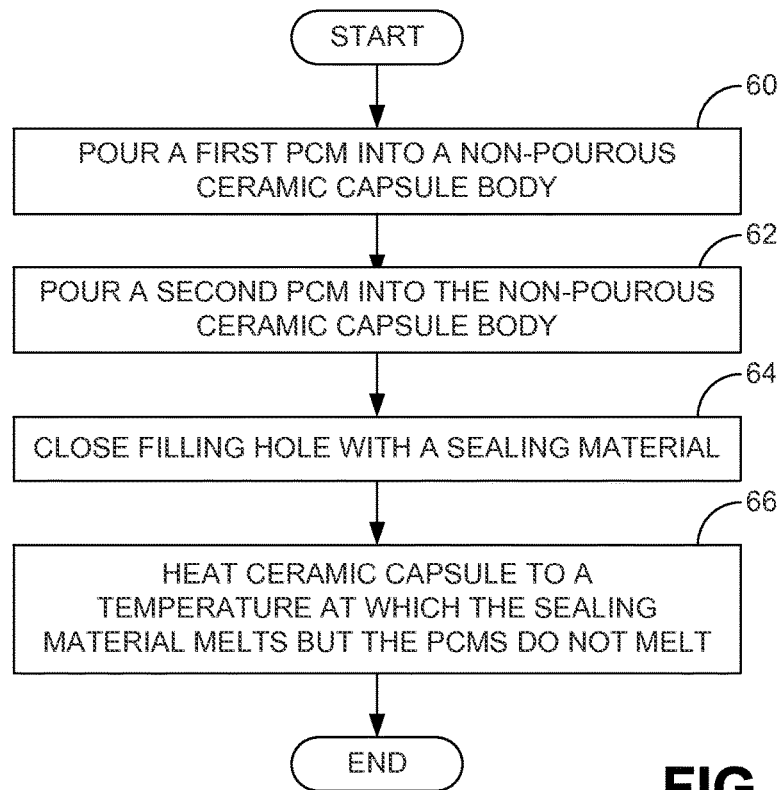
FIG. 5 is a flow diagram of a first embodiment of a method for closing and sealing a body of a ceramic PCM capsule.

FIG. 5 illustrates an example method for closing and sealing a PCM capsule body consistent with the above-described approach. Beginning with block 60, a first PCM is poured into the non-porous ceramic capsule body. Next, with reference to block 62, a second PCM is poured into the non-porous ceramic capsule body so that there are two unmixed PCM layers within the capsule body.

Referring to block 64, the filling hole of the non-porous ceramic capsule body is closed with a sealing material. The sealing material, and the PCMs, are selected so that the melting point of the sealing material is lower than the melting points of the PCMs but higher than the melting point of the eutectic PCM formed when the PCMs are mixed together. At this point, the ceramic capsule can be sealed by heating the capsule to a temperature at which the sealing material melts but neither PCM melts, as indicated in block 66.

Figure 6:
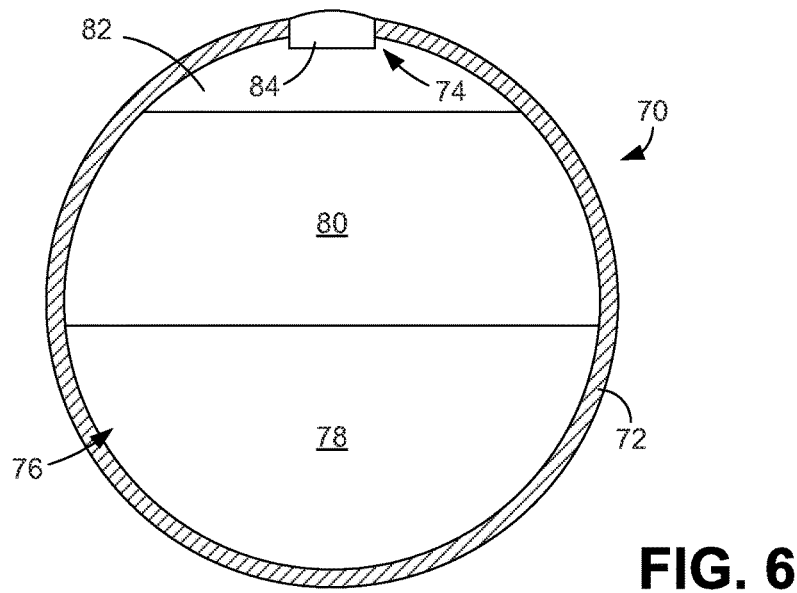
FIG. 6 is a cross-sectional view of an embodiment of a ceramic PCM capsule formed using the method of FIG. 5.

FIG. 6 illustrates an example of a ceramic PCM capsule constructed using the method of FIG. 5. As shown in FIG. 6, a capsule body 70 includes a spherical outer shell 72, which is made of ceramic material. The shell 72 includes a filling hole 74 that has been used to fill the interior space 76 of the body 70 with a first PCM layer 78 and a second PCM layer 80. As indicated in the figure, the PCMs are not yet mixed with each other. As is also apparent from FIG. 6, there is free space 82 above the PCM layers 78, 80 to enable for expansion of the PCMs. The hole 74 is closed and sealed with a closure member or plug 84 made of a sealing material, such as one of the sealing materials described above.

An example of the method described above in relation to FIG. 6 is provided below in Example 1.

Example 1

Potassium chloride powder is poured into a sintered ceramic capsule (formed using either the first or second approach described above) followed by sodium chloride power, thereby resulting in the capsule containing two separate layers of potassium chloride and sodium chloride. The hole is then plugged with sodium tetraborate, which melts at a temperature higher than the eutectic MP but lower than the MP of potassium chloride or sodium chloride alone. This enables sealing of the hole by melting the sodium tetraborate without leaking (creeping) of molten salt. The PCM-filled capsule is then heated to approximately 760° C. and then slowly cooled. The sodium tetraborate melts at the elevated temperature and solidifies upon cooling thus sealing the hole. The sealed capsule is then vigorously shaken to mix the individual salts to form a eutectic salt. The capsule can then be subjected to thermal testing at approximately 680° C., which is 23° C. greater than the MP of the eutectic salt but 60° C. below the melting point of sodium tetraborate sealing material. The completed capsule can survive a large number of thermal cycles.

Figure 7:
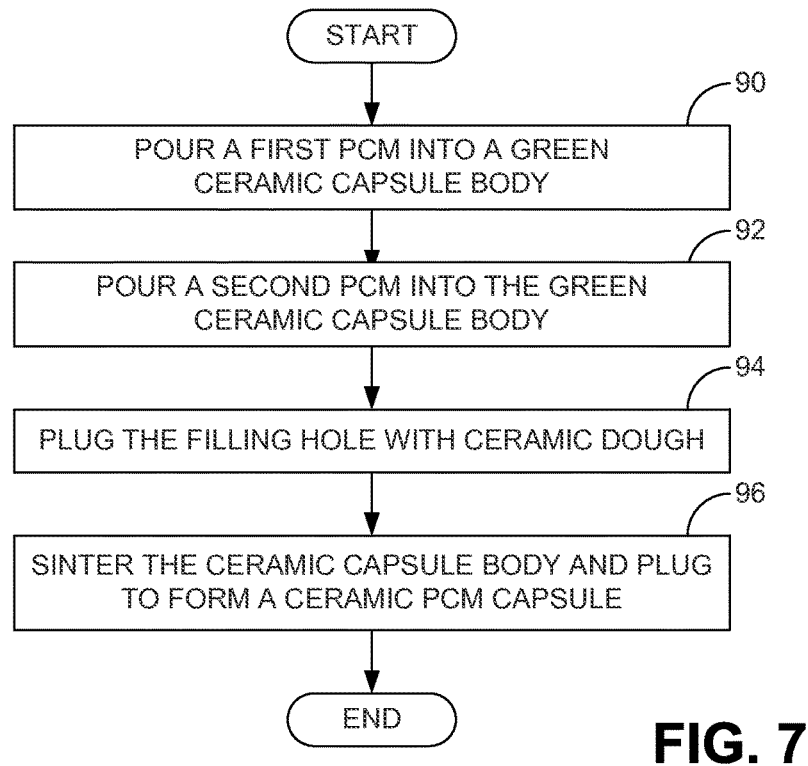
FIG. 7 is a flow diagram of a second embodiment of a method for closing and sealing a body of a ceramic PCM capsule.

In a second approach, the filling hole of the capsule body can be closed and sealed with ceramic material similar to that used to form the capsule body. FIG. 7 illustrates an example method for closing and sealing a ceramic PCM capsule. Beginning with block 90 of FIG. 7, a first PCM is poured into a green ceramic capsule body. Next, with reference to block 92, a second PCM is poured into the green ceramic capsule body so that there are two unmixed PCM layers within the capsule body.

Referring to block 94, the filling hole of the non-porous ceramic capsule body is plugged with further green ceramic material, which can be the same material that was used to form the capsule body. Once the capsule body has been filled to the desired degree, the capsule body and plug can be sintered to close and seal the capsule, as indicated in block 96. By way of example, sintering can be performed at approximately 1040° C.

Figure 8:
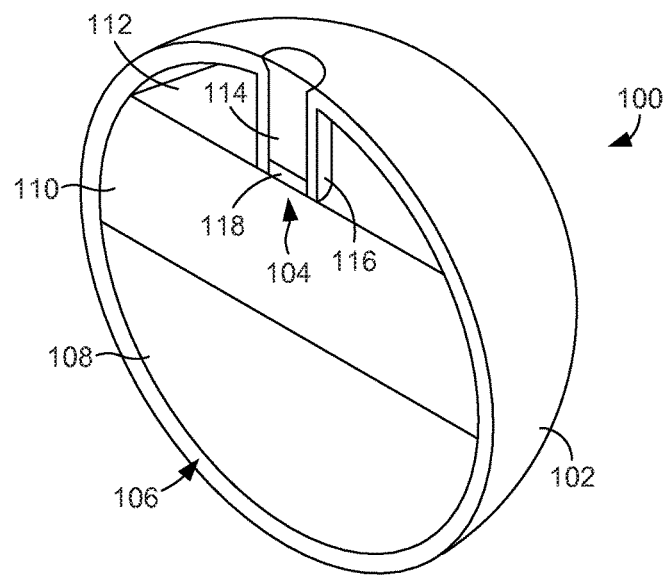
FIG. 8 is a cross-sectional view of an embodiment of a ceramic PCM capsule formed using the method of FIG. 7.

FIG. 8 illustrates an example of a ceramic PCM capsule constructed using the method of FIG. 7. As shown in FIG. 8, a capsule body 100 includes a spherical outer shell 102, which is made of ceramic material. The shell 102 includes a filling hole 104 that has been used to fill the interior space 106 of the body 100 with a first PCM layer 108 and a second PCM layer 110. As indicated in the figure, the PCMs are not yet mixed with each other. As is also apparent from FIG. 8, there is free space 112 above the PCM layers 108, 110 to enable for expansion of the PCMs. The hole 104 is closed and sealed with a closure member or plug 114 made of ceramic material. As indicated in FIG. 8, the plug 114 can fill a sealing pipe 116 associated with the filling hole 104 and integrated into the capsule shell 102. The sealing pipe 116 extends down into the capsule body 100 and facilitates the formation of the ceramic plug 114, which can be covered with a layer 118 of sealing material, such as sodium tetraborate.

An example of the method described above in relation to FIG. 7 is provided below in Example 2.

Example 2

A eutectic mixture of sodium silicate and lithium metasilicate melts at 847° C. This temperature is lower than the sintering temperature of a green ceramic capsule. The green ceramic capsule is dried at 200° C. to remove the majority of trapped water. Lithium metasilicate powder is then poured into the ceramic capsule followed by sodium silicate powder. This results in the formation of two separate layers of lithium metasilicate (MP=1230° C.) and sodium silicate (MP=1088° C.). The hole through which the silicate powders are poured includes a sealing pipe that is plugged with a ceramic dough having the same composition as the body of the capsule. This enables one to completely sinter the ceramic body and the plug in a single step and prevents a mismatch between the plugging material and the main ceramic body material. The filled ceramic capsule is heated to approximately 1100° C. and then slowly cooled. The sodium silicate melts at the elevated temperature and dissolves the lithium metasilicate, resulting in the in-situ formation of the eutectic PCM. The capsule can then be subjected to thermal cycling at approximately 880° C.

Ceramic Coating of PCM Pellets

In each of the above-described embodiments, a ceramic capsule body has been initially fabricated and later filled with one or more PCMs. In alternative embodiments, solid PCM pellets can be initially formed and then coated with a ceramic material. For example, a solid PCM pellet can be formed from two different PCMs and then coated with a ceramic material. The coated pellet can then be heated to simultaneously sinter the ceramic material and melt at least one of the PCMs, so as to form a eutectic PCM in-situ.

Figure 9:
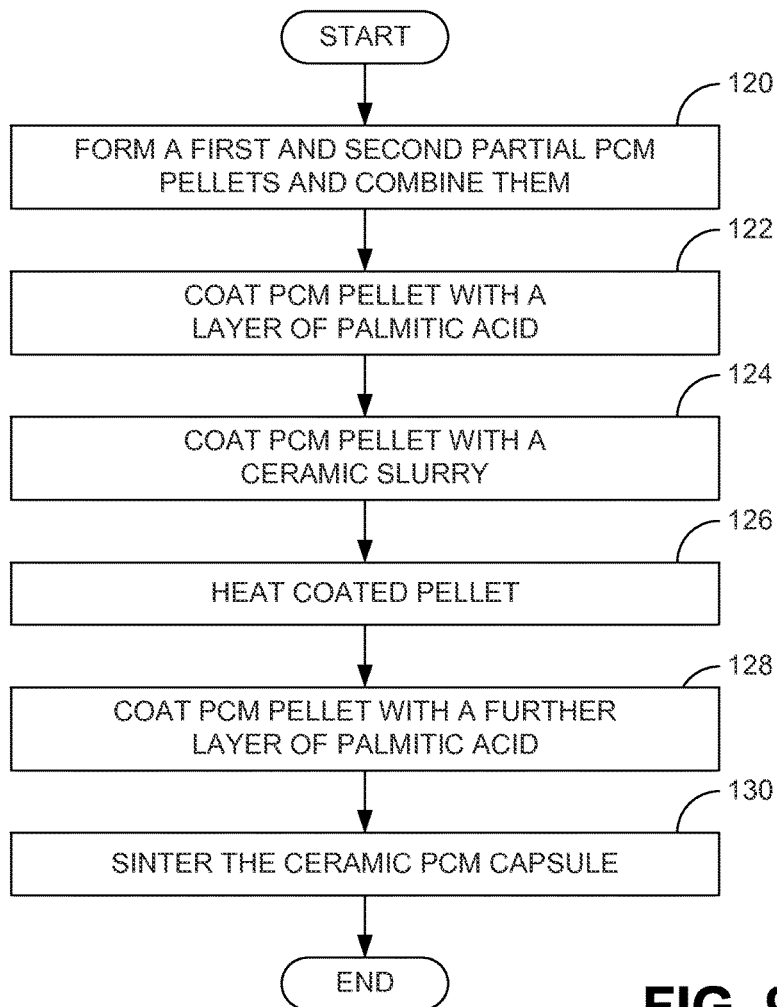
FIG. 9 is a flow diagram of an alternative embodiment of a method for forming a ceramic PCM capsule.

FIG. 9 illustrates an example method for forming a ceramic PCM capsule by coating a PCM pellet. Beginning with block 120, first and second solid partial PCM pellets are formed and combined to form a whole pellet. For example, two hemispherical PCM pellets can be formed and combined to form a solid spherical pellet. Next, the whole pellet is first coated with a layer of palmitic acid, as indicated in block 122, and then coated with a ceramic slurry, as indicated in block 124.

The coated pellet can then be heated, as indicated in block 126. In some embodiments, the coated pellet can be heated at approximately 120 to 150° C. This heating causes the palmitic acid to melt and seep through the pores of the green ceramic material. This creates a void between the ceramic material and the PCM that accommodates the expansion of the solid PCM at elevated temperatures.

At this point, the pellet is coated with further ceramic slurry material, as indicated in block 128, and then sintered to form a sintered ceramic PSM capsule, as indicated in block 130. In some embodiments, sintering can be performed at approximately 1040° C. to 1110° C.

Figure 10:
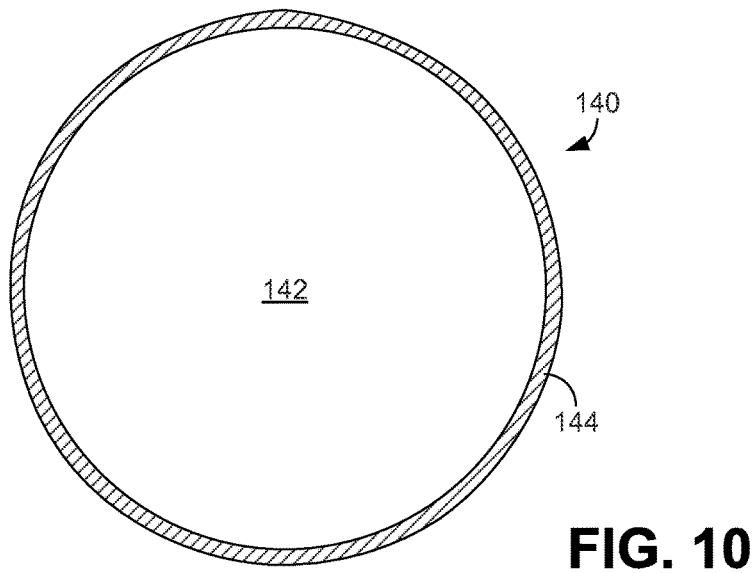
FIG. 10 is a cross-sectional view of an embodiment of a ceramic PCM capsule formed using the method of FIG. 9.

FIG. 10 illustrates an example ceramic PSM capsule fabricated using the method of FIG. 9. As shown in the figure, the capsule 140 comprises PCM material 142 that is surrounded by ceramic material 144. An example of the method described above in relation to FIG. 9 is also provided below in Example 3.

Example 3

A semispherical pellet of sodium metasilicate and a semispherical lithium metasilicate are made. These two pellets are brought together to form a spherical pellet and this pellet is then coated with molten palmitic acid. The palmitic acid solidifies and forms a thin layer over the spherical pellet. A ceramic slurry is then applied over the palmitic acid-coated pellet. The resulting ceramic-coated pellet is air dried and heated to 120 to 150° C. As noted above, this causes the palmitic acid to melt and seep through the pores of the green ceramic material and create a void between the ceramic body and the PCM that accommodates the expansion of the solid PCM at elevated temperatures. The palmitic acid can be fully recovered after completing its spacing function and can be reused. The use of a material having a low melting temperature for the creation of a void between the PCM and the ceramic layer is environmentally friendly as it does not emit toxic gases, as is the case when the sacrificial polymeric layers are decomposed to create a void.

The ceramic material of the capsule is then partially sintered and another layer of ceramic material is applied. The ceramic capsule is then sintered at approximately 1040 to 1100° C. for approximately an hour. At this temperature, the ceramic layer will be fully sintered and the sodium metasilicate will melt and dissolves the lithium metasilicate, enabling the in-situ formation of a eutectic PCM. The capsule can then subjected to thermal cycling at 880° C., which is 33° C. above the eutectic PCM MP but below the sintering temperature.

The invention claimed is:

1. A method for fabricating a ceramic phase change material capsule, the method comprising:
   forming a hollow ceramic capsule body having a filling hole;
   heating the ceramic capsule body to at least partially sinter the ceramic capsule body;
   filling the ceramic capsule body with one or more phase change materials via the filling hole;
   closing the filling hole with a plug to form a closed capsule; and
   heating the closed capsule to a temperature above a melting point of the plug but below a melting point of the one or more phase change materials so as to melt the plug and seal the capsule without melting the one or more phase change materials.

2. The method of claim 1, wherein forming a ceramic capsule body comprises immersing the ceramic capsule body in a solution comprising a sealing material.

3. The method of claim 2, wherein the sealing material comprises an alkali metal silicate, a borate, or a mixture thereof.

4. The method of claim 1, wherein forming a ceramic capsule body comprises mixing a sealing material with a ceramic material to form a material used to form the ceramic capsule body.

5. The method of claim 1, wherein forming a ceramic capsule body comprises coating interior surfaces of the ceramic capsule body with a solution comprising a sealing material.

6. The method of claim 5, wherein the sealing material comprises an alkali metal silicate, a borate, or a mixture thereof.

7. The method of claim 1, wherein closing and sealing the filling hole comprises closing the filling hole with a plug of sealing material.

8. The method of claim 1, wherein closing and sealing the filling hole comprises closing the filling hole with a plug of ceramic material.

9. The method of claim 1, wherein filling the ceramic capsule body with one or more phase change materials comprises filling the ceramic capsule body with two phase change materials in a manner in which they do not mix with each other.

10. The method of claim 9, wherein filling the capsule body comprises first filling the capsule body with a first phase change material to form a first layer of phase change material and then filling the capsule body with a second phase change material to form a second layer of phase change material that overlies the first layer.

11. The method of claim 10, further comprising physically manipulating the sealed capsule so as to mix the first and second phase change materials together and form a eutectic phase change material.

12. The method of claim 11, wherein the temperature to which the closed capsule is heated is higher than a melting point of the eutectic phase change material.

13. A method for fabricating a ceramic phase change material capsule, the method comprising:
   forming a hollow, green ceramic capsule body having a filling hole;
   heating the green ceramic capsule body to at least partially sinter the ceramic capsule body;
   filling the ceramic capsule body with two or more phase change materials via the filling hole in a manner in which the phase change materials do not mix with each other within the ceramic capsule body;
   closing the filling hole with a plug to form a closed capsule; and
   heating the closed capsule to a temperature above a melting point of the plug, below melting points of the two or more phase change materials, and above a melting point of a eutectic phase change material that results when the two or more phase change materials are mixed together, so as to melt the plug and seal the capsule without melting the two or more phase change materials; and
   physically manipulating the sealed capsule so as to mix the two or more phase change materials together and form the eutectic phase change material.

14. The method of claim 13, further comprising sealing the ceramic capsule body using a sealing material that is either mixed with ceramic material that is used to form the ceramic capsule body or is applied to the ceramic capsule body.

15. The method of claim 14, wherein the sealing material comprises an alkali metal silicate, a borate, or a mixture thereof.

\* \* \* \* \*